United States Patent
Zhang et al.

(10) Patent No.: US 10,515,217 B2
(45) Date of Patent: Dec. 24, 2019

(54) TECHNOLOGIES FOR MITIGATING CALL-ORIENTED PROGRAMMING USING AN INTER-MODULE CONTROL FLOW POLICY

(71) Applicant: Intel Corporation, Santa Clara, CA (US)

(72) Inventors: Mingwei Zhang, Hillsboro, OR (US); Salmin Sultana, Hillsboro, OR (US); Ravi L. Sahita, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 15/719,956

(22) Filed: Sep. 29, 2017

(65) Prior Publication Data

US 2019/0102550 A1 Apr. 4, 2019

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| G06F 21/56 | (2013.01) |

(52) U.S. Cl.
CPC ...... *G06F 21/566* (2013.01); *G06F 2221/033* (2013.01)

(58) Field of Classification Search
CPC .............................. G06F 21/566; G06F 21/44
USPC .......................................................... 726/23
See application file for complete search history.

(56) References Cited

U.S. PATENT DOCUMENTS

| | | | | |
|---|---|---|---|---|
| 2008/0256347 | A1* | 10/2008 | Eickemeyer | G06F 9/322 712/240 |
| 2011/0145800 | A1* | 6/2011 | Rao | G06F 11/323 717/133 |
| 2012/0204016 | A1* | 8/2012 | Chen | G06F 8/433 712/226 |
| 2013/0024676 | A1* | 1/2013 | Glew | G06F 9/30076 712/244 |
| 2016/0170769 | A1* | 6/2016 | LeMay | G06F 9/3863 713/190 |
| 2016/0196427 | A1* | 7/2016 | Davidov | G06F 21/54 726/23 |

* cited by examiner

*Primary Examiner* — Jeffrey C Pwu
*Assistant Examiner* — Samuel Ambaye
(74) *Attorney, Agent, or Firm* — Barnes & Thornburg LLP

(57) ABSTRACT

Technologies for control flow validation a computing device having a processor with real-time instruction tracing support. The processor generates trace data indicative of control flow of a protected application. The computing device identifies an indirect branch target based on the trace data and determines whether the indirect branch target is included in the same module as a previous indirect branch target. If the indirect branch target and the previous indirect branch target are not included in the same module, the computing device determines whether an inter-module transfer policy is satisfied. If satisfied, the indirect branch target is stored as the previous indirect branch target and the protected application continues to execute. If the policy is not satisfied, the computing device generates an exception. The policy may be satisfied, for example, if the indirect branch target is an exported function. Other embodiments are described and claimed.

24 Claims, 4 Drawing Sheets

TECHNOLOGIES FOR MITIGATING CALL-ORIENTED PROGRAMMING USING AN INTER-MODULE CONTROL FLOW POLICY

BACKGROUND

Return-oriented programming (ROP) exploits are an increasingly common form of malicious software (malware) that may circumvent certain defenses that mark locations of memory as non-executable. An ROP exploit works by stringing together a large number of existing segments of executable code that each end with a "return" instruction (known as gadgets). Each ROP gadget is typically short, and typically does not correspond to an existing procedure or even an existing instruction boundary in the executable code. The attacker constructs a malicious stack including a series of return addresses pointing to the desired sequence of gadgets. The ROP exploit is performed by causing the processor of the computer to execute software using the malicious stack instead of the legitimate system stack. For example, the malicious stack may be introduced by smashing the stack, using a buffer overflow exploit, pivoting to a new stack, or otherwise corrupting the system stack. Jump-oriented programming (JOP) exploits are similar, but target gadgets that end with an indirect jump instruction rather than a return instruction.

Advanced code-reuse attacks may not necessarily rely on return or jump instructions. Instead, certain advanced code-reuse attacks may use valid function entry points that could be indirectly called to launch attacks. Such code-reuse attacks may include call-oriented programming (COP), counterfeit object-oriented programming (COOP), or loop oriented programming (LOP). Those attacks may bypass defense techniques such as coarse grained control-flow integrity, control flow enforcement, or control flow guard.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
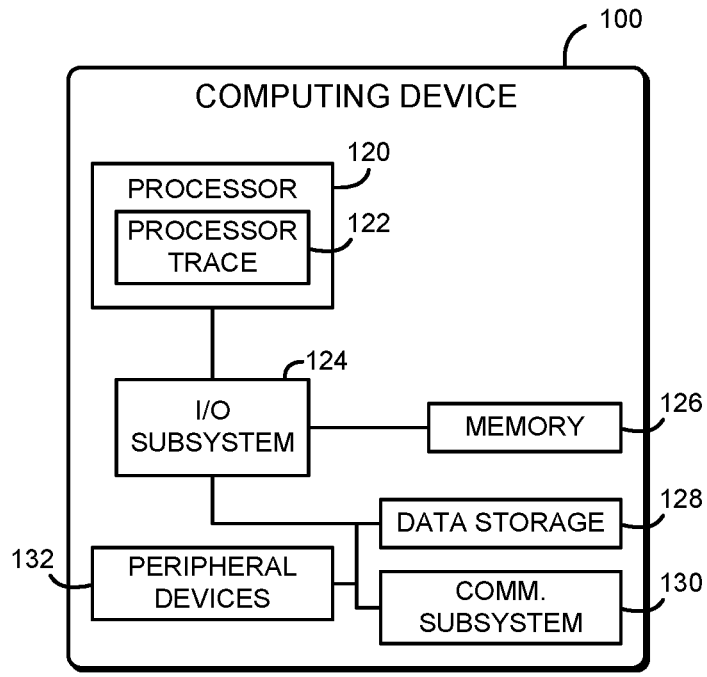
FIG. 1 is a simplified block diagram of at least one embodiment of a computing device for call-oriented programming exploit mitigation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for control flow exploit detection and mitigation includes a processor 120 having hardware real-time instruction tracing (RTIT) support. In use, as described below, the computing device 100 executes a protected application with the RTIT support enabled, and the processor 120 automatically outputs trace data indicative of the control flow of the protected application. The computing device 100 analyzes the trace data to identify indirect branch targets such as indirect calls, exceptions, or other branches. The computing device 100 determines whether an indirect branch target is included in the same module as the previous indirect branch target and, if not, applies an inter-module control transfer policy to determine whether to allow the transfer. Thus, the computing device 100 detects and performs a policy evaluation for indirect control flow transfers, even to valid function entry points. Accordingly, the computing device 100 may detect and prevent advanced code reuse attacks such as call-oriented programming attacks that cannot be detected by other control flow integrity defense techniques. Additionally, by using the RTIT support of the processor 120, the computing device 100 may provide control flow protection with acceptable performance and power consumption without instrumenting or otherwise modifying existing application binaries. For example, tests of the control flow exploit detection with existing large software applications resulted in processor cycle overhead of between 0% and about 20%.

The computing device 100 may be embodied as any type of device capable of real-time instruction tracing and otherwise performing the functions described herein. For example, the computing device 100 may be embodied as, without limitation, a computer, a desktop computer, a workstation, a server computer, a laptop computer, a notebook computer, a tablet computer, a smartphone, a mobile computing device, a wearable computing device, a distributed computing system, a multiprocessor system, a consumer electronic device, a smart appliance, and/or any other computing device capable of real-time instruction tracing. As shown in FIG. 1, the illustrative computing device 100 includes the processor 120, an I/O subsystem 124, a memory 126, and a data storage device 128. Of course, the computing device 100 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. The processor 120 includes real-time instruction tracing (RTIT) support 122. The RTIT support 122 may be embodied as any hardware, microcode, firmware, digital logic, or other components of the processor 120 capable of generating trace data that may be used to reconstruct the control flow executed by the processor 120. The RTIT support 122 may log data packets relating to whether conditional branches are taken or not taken, target addresses of indirect branch instructions, target addresses of mispredicted return instructions, and other data related to control flow. The trace data, in combination with the in-memory image of the executed application, may be used to reconstruct the control flow executed by the processor 120. The RTIT support 122 may be embodied as, for example, Intel® Processor Trace (PT) technology.

Similarly, the memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices.

In some embodiments, the computing device 100 may also include communication circuitry 130 and one or more peripheral devices 132. The communication circuitry 130 of the computing device 100 may be embodied as any communication circuit, device, or collection thereof, capable of enabling communications between the computing device 100 and other remote devices over a computing network. The communication circuitry 130 may be configured to use any one or more communication technology (e.g., wired or wireless communications, Ethernet, Bluetooth®, Wi-Fi®, WiMAX, Infiniband, etc.) and associated protocols (e.g., TCP, UDP, iWARP, RDMA, etc.) to effect such communication. The peripheral devices 132 may include any number of additional input/output devices, interface devices, and/or other peripheral devices. For example, in some embodiments, the peripheral devices 132 may include a display, touch screen, graphics circuitry, keyboard, mouse, speaker system, and/or other input/output devices, interface devices, and/or peripheral devices.

Figure 2:
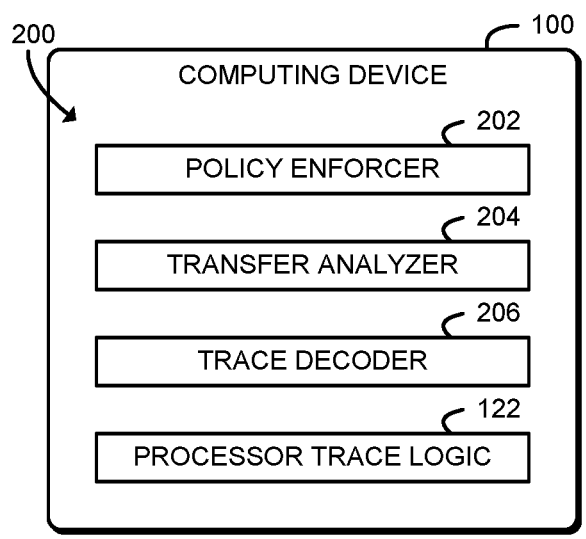
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative embodiment 200 includes a policy enforcer 202, a transfer analyzer 204, a trace decoder 206, and the processor trace logic 122. The various components of the environment 200 may be embodied as hardware, firmware, software, or a combination thereof. As such, in some embodiments, one or more of the components of the environment 200 may be embodied as circuitry or a collection of electrical devices (e.g., policy enforcer circuitry 202, transfer analyzer circuitry 204, trace decoder circuitry 206, and/or processor trace logic circuitry 122). In should be appreciated that, in such embodiments, one or more of the policy enforcer circuitry 202, the transfer analyzer circuitry 204, the trace decoder circuitry 206, and/or the processor trace logic circuitry 122 may form a portion of one or more of the processor 120, the I/O subsystem 124, and/or other components of the computing device 100. Additionally, in some embodiments, one or more of the illustrative components may form a portion of another component and/or one or more of the illustrative components may be independent of one another.

The processor trace logic 122 is configured to generate trace data indicative of control flow of a protected application executed by the computing device 100. The protected application may be embodied as any user mode process, thread, lightweight process, or other program executed by the computing device 100. The protected application may be executed by the processor 122 without using binary instrumentation or otherwise modifying the associated application binary.

The trace decoder 206 is configured to identify an indirect branch target based on the trace data. The trace decoder 206 is further configured to identify an asynchronous flow update based on the trace data and, in response, to update a thread context. Updating the thread context may include updating a previous indirect branch target based on the thread context. The trace decoder 206 may be further configured to extract target instruction pointer (TIP) and flow update (FUP) packets from the trace data. The trace decoder 206 may extract the TIP and FUP packets by a kernel mode process or a user mode process of the computing device 100.

The transfer analyzer 204 is configured to determine whether the indirect branch target is included in the same module of the protected application as a previous indirect branch target. The module of the protected application may be embodied as, for example, a dynamically linked module of executable code. Determining whether the indirect branch target is included in the module may include accessing a memory address space map of the protected application. Determining whether the indirect branch target is included in the module may be performed after updating the thread context in response to identifying an asynchronous flow update.

The policy enforcer 202 is configured to determine whether an inter-module transfer policy is satisfied in response to determining that the indirect branch target is not included in the same module as the previous indirect branch target. The policy enforcer 202 is configured to store the indirect branch target as the previous indirect branch target if the inter-module transfer policy is satisfied. The policy enforcer 202 is further configured to generate an exception if the inter-module transfer policy is not satisfied. Determining whether the inter-module transfer policy is satisfied may include determining whether the indirect branch target is an exported function, and if so, determining whether the exported function is a memory permission function. If the indirect branch target is not an exported function, determining whether the inter-module transfer policy is satisfied may include determining whether the module of the indirect branch target and the module of the previous indirect branch target originate from the same package, determining whether an express object inheritance chain exists from the module of the indirect branch target and the module of the previous indirect branch target, or determining whether the indirect branch target is included in a predetermined list of valid targets (i.e., a whitelist).

Figure 3:
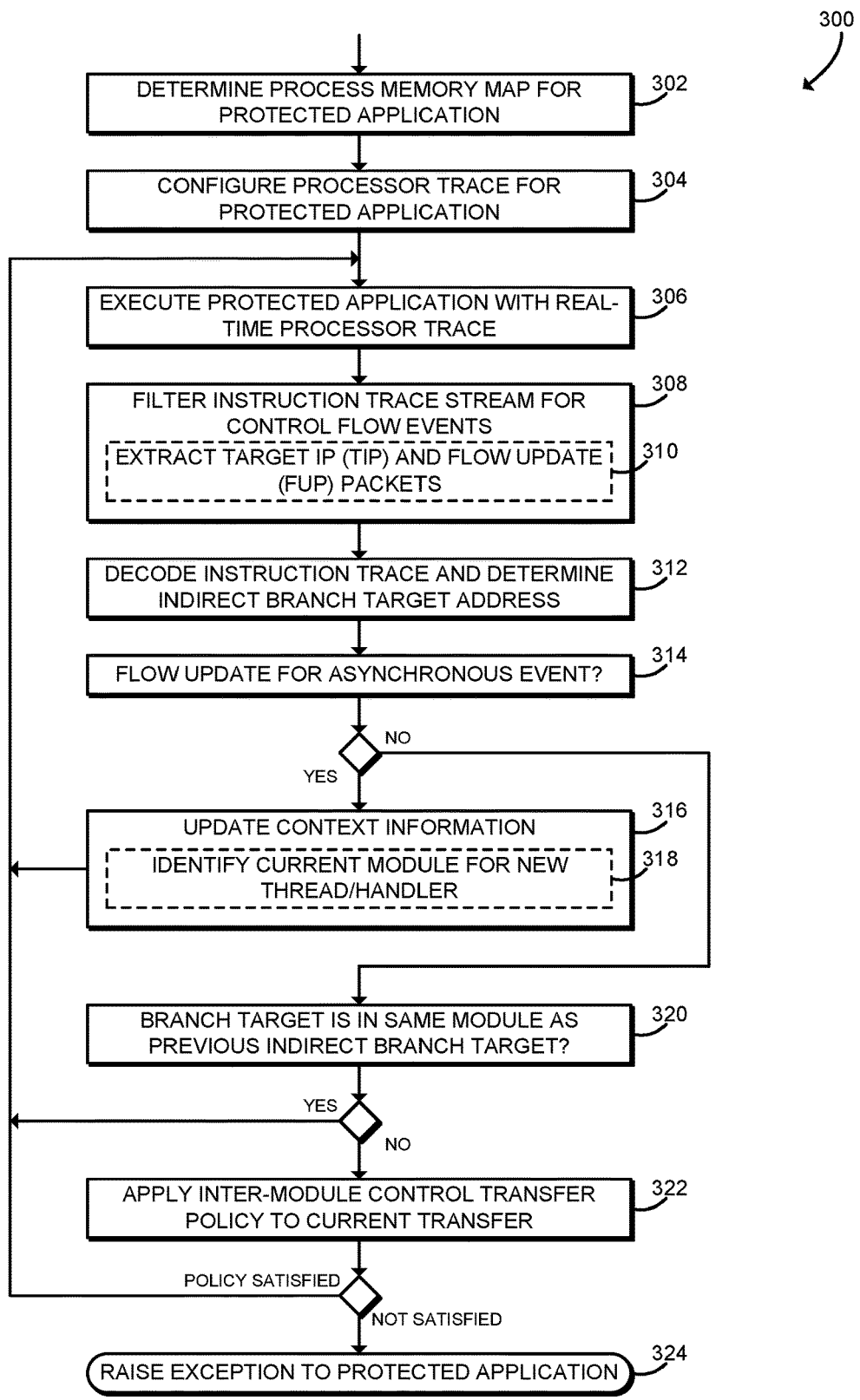
FIG. 3 is a simplified flow diagram of at least one embodiment of a method for code-reuse exploit mitigation that may be executed by the computing device of FIGS. 1 and 2.

Referring now to FIG. 3, in use, the computing device 100 may execute a method 300 for code-reuse exploit mitigation. It should be appreciated that, in some embodiments, the operations of the method 300 may be performed by one or more components of the environment 200 of the computing device 100, as shown in FIG. 2. The method 300 begins in block 302, in which the computing device 100 determines a process memory map for a protected application. The process memory map identifies a range in the protected application's address space associated with each module used by the protected application. The modules may include, for example, statically linked modules, dynamically linked modules, loadable modules, or other components of executable code used by the protected application. Due to address space layout randomization (ASLR), the particular memory range used by each module may change, and thus the computing device 100 may determine the process memory map for every execution of the protected application. The computing device 100 may use one or more kernel-mode components (e.g., a processor trace collector driver) or other system tools to generate the process map or otherwise read the memory layout of the protected application. For example, on a Linux®-based system, the process memory map may be read from a special file maintained by the kernel, such as /proc/pid/maps. In some embodiments, the computing device 100 may update the process memory map based on dynamic code loading/unloading or other changes to the memory layout of the protected process.

In block 304, the computing device 100 configures the RTIT support 122 of the processor 120 to perform processor tracing for the protected application. The computing device 100 may, for example, execute one or more specialized processor instructions, write to one or more control registers, or otherwise command the processor 120 to enable the RTIT support 122. For example, the computing device 100 may configure the processor 120 to enable processor trace generation for a certain value of the CR3 register, which causes the processor 120 to perform processor tracing only for a single application. Additionally or alternatively, in some embodiments the computing device 100 may configure the processor 120 to enable processor trace generation only for certain instruction pointer (IP) ranges within the protected application.

In block 306, after enabling the RTIT support 122, the computing device 100 executes the protected application with real-time processor tracing enabled. During execution of the protected application, the processor 120 generates trace data based on the executed instruction flow of the protected application. The trace data may include a stream of data packets that can be decoded to reconstruct the control flow of the protected application.

In block 308, the computing device 100 filters the instruction trace data stream for control flow events. The control flow events may include indirect branches, asynchronous changes in control flow (e.g., interrupts and exceptions), or other change in control flow events. The instruction trace data stream includes a large amount of data, some of which may not be needed to identify the control flow events. Thus, filtering the instruction trace data stream may reduce the processor cycles and/or bandwidth used by the computing device 100 to detect potential code-reuse exploits. Additionally or alternatively, in some embodiments the filtering may be performed in kernel space (e.g., by a processor trace collector driver), which may reduce the amount of data that is transferred to user space and thus further improve performance.

In some embodiments, in block 310 the computing device 100 may extract target instruction pointer (TIP) packets and flow update (FUP) packets from the instruction trace data. TIP packets may be generated, for example, in response to invocation of indirect call instructions, in response to execution of mispredicted return instructions (that is, return instructions that do not correspond to an observed call instruction), and in response to exceptions and interrupts. In some embodiments, TIP packets may also be generated for some or all predicted return instructions. FUP packets may be generated in response to operations such as interrupts, exceptions, enabling transactional memory, or other asynchronous changes in control flow. By extracting only TIP and FUP packets, the computing device 100 may significantly reduce the amount of instruction trace data to be processed.

In block 312, the computing device 100 decodes the instruction trace data to determine an indirect branch target address. The indirect branch target address may be determined based on a TIP packet, and identifies the target address in memory of the indirect call, return, interrupt, exception, or other indirect branch. In some embodiments, the computing device 100 may also determine a source address based on an FUP packet that identifies the source address of an asynchronous event (e.g., an interrupt or exception) that may not be determined based on the binary of the protected application. The TIP packet may not include source address information; therefore, for synchronous indirect branches such as indirect calls, the source address may not be available in the instruction trace data.

In block 314, the computing device 100 determines whether a flow update for an asynchronous event such as an interrupt or exception has been encountered. For example, the computing device 100 may determine whether an FUP packet has been generated in the instruction trace data. If no asynchronous flow update has occurred, the method 300 branches ahead to block 320, described below. If an asynchronous flow update has occurred, the method 300 advances to block 316.

In block 316, the computing device 100 updates context information based on the asynchronous flow update. In some embodiments, in block 318 the computing device 100 may identify the current module for the new thread, signal handler, or other entity executed by the computing device 100 in response to the asynchronous flow update. For example, the computing device 100 may use the process memory map of the protected application to identify the module that includes the target address of a TIP packet that is bound to the FUP packet. The computing device 100 may store the target address associated with the asynchronous flow update as a previous indirect branch target, which may be used to detect inter-module transfers as described further below. The computing device 100 may store contexts for multiple threads and/or other entities, and may switch between those contexts in response to asynchronous flow updates. After updating the context information, the method 300 loops back to block 306 to continue executing the protected application.

Referring back to block 314, if a flow update for an asynchronous event is not detected, the method 300 branches to block 320, in which the computing device 100 determines whether the current indirect branch target is located in the same module as a previous indirect branch target taken by the computing device 100. The computing device 100 may use the process memory map of the protected application to identify the module that includes each indirect branch target address. If the current indirect branch target and the previous indirect branch target are not in the same module, then an inter-module control flow transfer (e.g., an indirect call to a function in a different module) has likely occurred. Of course, after performing the comparison, the computing device 100 may store the current indirect branch target as the previous indirect branch target for subsequent comparisons. If the current indirect branch target and the previous indirect branch target are in the same module, the method 300 loops back to block 306 to continue executing the protected application. If the current indirect branch target and the previous indirect branch target are not in the same module, then the method 300 advances to block 322.

In block 322, the computing device 100 applies an inter-module control transfer policy to the current transfer. The inter-module control transfer policy may apply one or more rules to determine whether to allow the protected application to continue executing or to deny the inter-module transfer, for example by generating a security exception. For example, the computing device 100 may allow inter-module transfers to exported functions or other public application programming interfaces (APIs), with exceptions for APIs that modify memory permissions. As another example, the computing device 100 may deny inter-module transfers for non-exported functions, except for modules from the same package, with an express object inheritance chain, or expressly whitelisted functions. One potential embodiment of a method for applying the inter-module control transfer policy is described below in connection with FIG. 4.

If the inter-module control transfer policy is satisfied, the method 300 loops back to block 306 to continue executing the protected application. If the inter-module control transfer policy is not satisfied, the method 300 branches to block 324, in which the computing device 100 raises an exception to the protected application. Raising the exception may terminate the protected application or otherwise allow the computing device 100 to mitigate a potential code-reuse exploit. After raising the exception, the method 300 is completed. The computing device 100 may execute the method 300 again to relaunch the protected application or to protect other applications.

Figure 4:
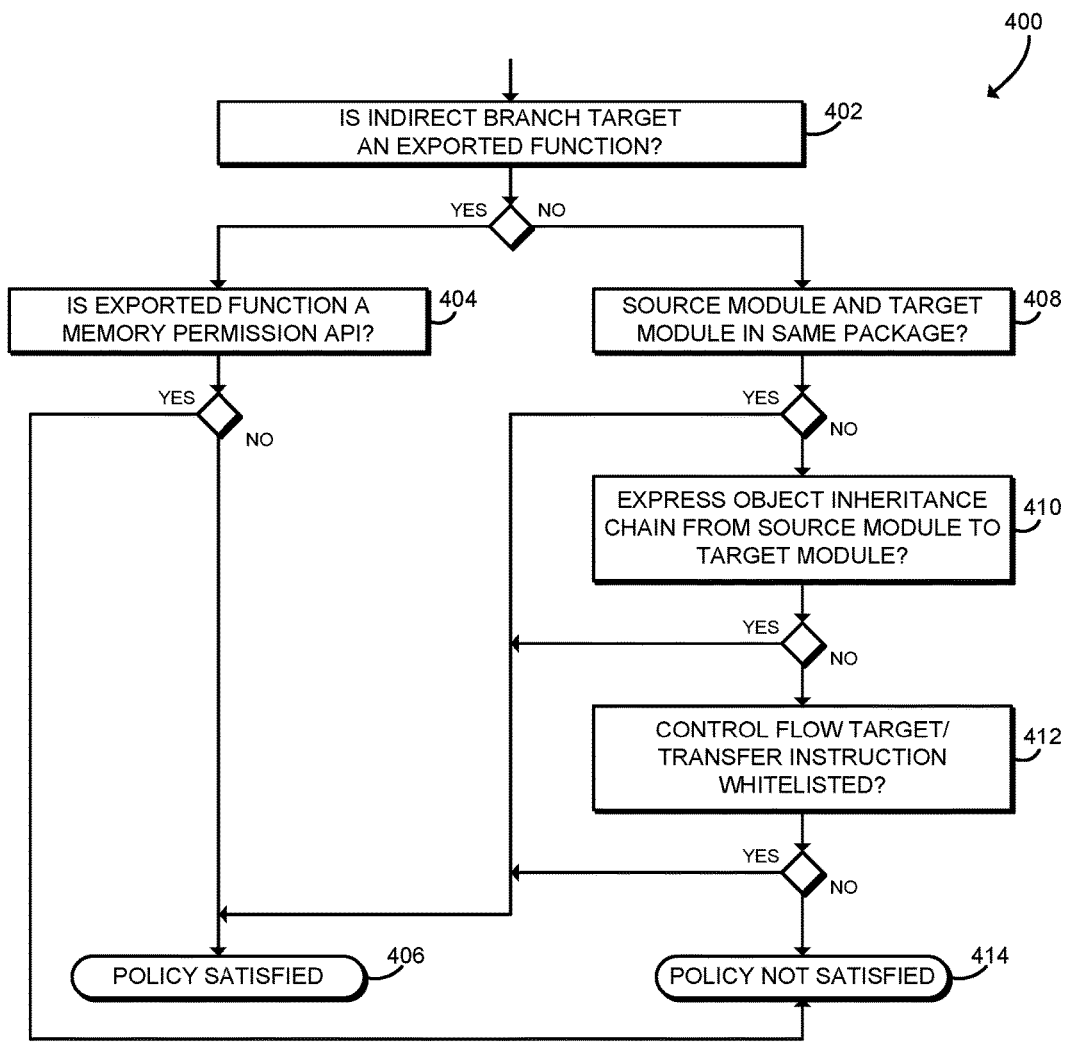
FIG. 4 is a simplified flow diagram of at least one embodiment of a method for applying an inter-module control flow policy that may be executed by the computing device of FIGS. 1 and 2.

Referring now to FIG. 4, in use, the computing device 100 may execute a method 400 for applying an inter-module control flow policy. The method 400 may be executed, for example, in connection with the block 322 of FIG. 3, described above. Also, it should be appreciated that, in some embodiments, the operations of the method 400 may be performed by one or more components of the environment 200 of the computing device 100, as shown in FIG. 2. The method 400 begins in block 402, in which the computing device 100 determines whether the indirect branch target is the entry point for an exported function. The computing device 100 may use any technique to determine whether the indirect branch target corresponds with an exported function. For example, the computing device 100 may read an export table or use other system tools to identify exported functions. If the current indirect branch target is not an exported function, the method 400 branches to block 408, described below. If the current branch target is an exported function, the method 400 branches to block 404.

In block 404, the computing device 100 determines whether the exported function for the current indirect branch target is an API function relating to memory permissions. An exploit may use memory permissions APIs to bypass control flow policies, for example by allocating executable memory and/or corrupting existing code. Therefore, the computing device 100 may deny inter-module transfers to memory permissions APIs. The memory permission API functions may include, for example, VirtualProtect and VirtualAlloc on Windows™-based systems, or mprotect and mmap on Linux-based systems. If the current indirect branch target is not a memory permission API function, the method 400 branches to block 406, in which the inter-module control transfer policy is satisfied. As described above in connection with block 322 of FIG. 3, if the inter-module control transfer policy is satisfied, the protected application may continue to execute. Referring back to block 404, if the current indirect branch target is a memory permission API function, the method 400 branches to block 414, in which the inter-module control transfer policy is not satisfied. As described above in connection with blocks 322, 324 of FIG. 3, if the inter-module control transfer policy is not satisfied, an exception may be raised and the protected application may be terminated.

Referring back to block 402, if the current indirect branch target is not an exported function, the method 400 branches to block 408. In block 408, the computing device 100 determines whether the source module (including the previous indirect branch target) and the target module (including the current indirect branch target) are included in the same package. The package may be embodied as an installation package, source project, or other collection of code in which internal function calls are allowed. The contents of a package may depend on the particular operating system or other execution environment used by the computing device 100. For example, for certain Linux-based systems, inter-module calls between the C standard library (libc.so) and the dynamic loader (ld.so) may be allowed. If the source module and the target module are included the same package, the method 400 branches to block 406, in which the inter-module control transfer policy is satisfied. If the source module and the target module are not included in the same package, the method 400 advances to block 410.

In block 410, the computing device 100 determines whether an express object inheritance chain exists from the source module to the target module. For example, in certain programming languages such as C++, a subclass may inherit from a base class, and objects of the subclass may invoke virtual functions of the base class. In those programming languages, code of a subclass included in a source module may thus use indirect calls or other indirect branches to invoke virtual base functions of the base class that are located in a target module. To determine whether an inheritance relationship exists, the computing device 100 may analyze one or more header files (e.g., .h files) or other class definition files associated with the source module and the target module. If an express object inheritance chain exists, the method 400 branches to block 406, in which the inter-module control transfer policy is satisfied. If no express object inheritance chain exists, the method 400 advances to block 412.

In block 412, the computing device 100 determines whether the indirect branch target and/or control flow transfer instruction that resulted in the indirect branch target is included in a predefined whitelist of allowed targets and/or instructions. The whitelist may include known indirect branch targets for certain software packages and/or other pre-identified special cases. If the indirect branch target and/or instruction is included in the whitelist, the method 400 branches to block 406, in which the inter-module control transfer policy is satisfied. If the indirect branch target and/or instruction is not included in the whitelist, the method 400 branches to block 414, in which the inter-module control transfer policy is not satisfied. As described above in connection with blocks 322, 324 of FIG. 3, if the inter-module control transfer policy is not satisfied, an exception may be raised and the protected application may be terminated. After determining whether the inter-module control transfer policy is satisfied or not satisfied, the method 400 is completed.

Figure 5:
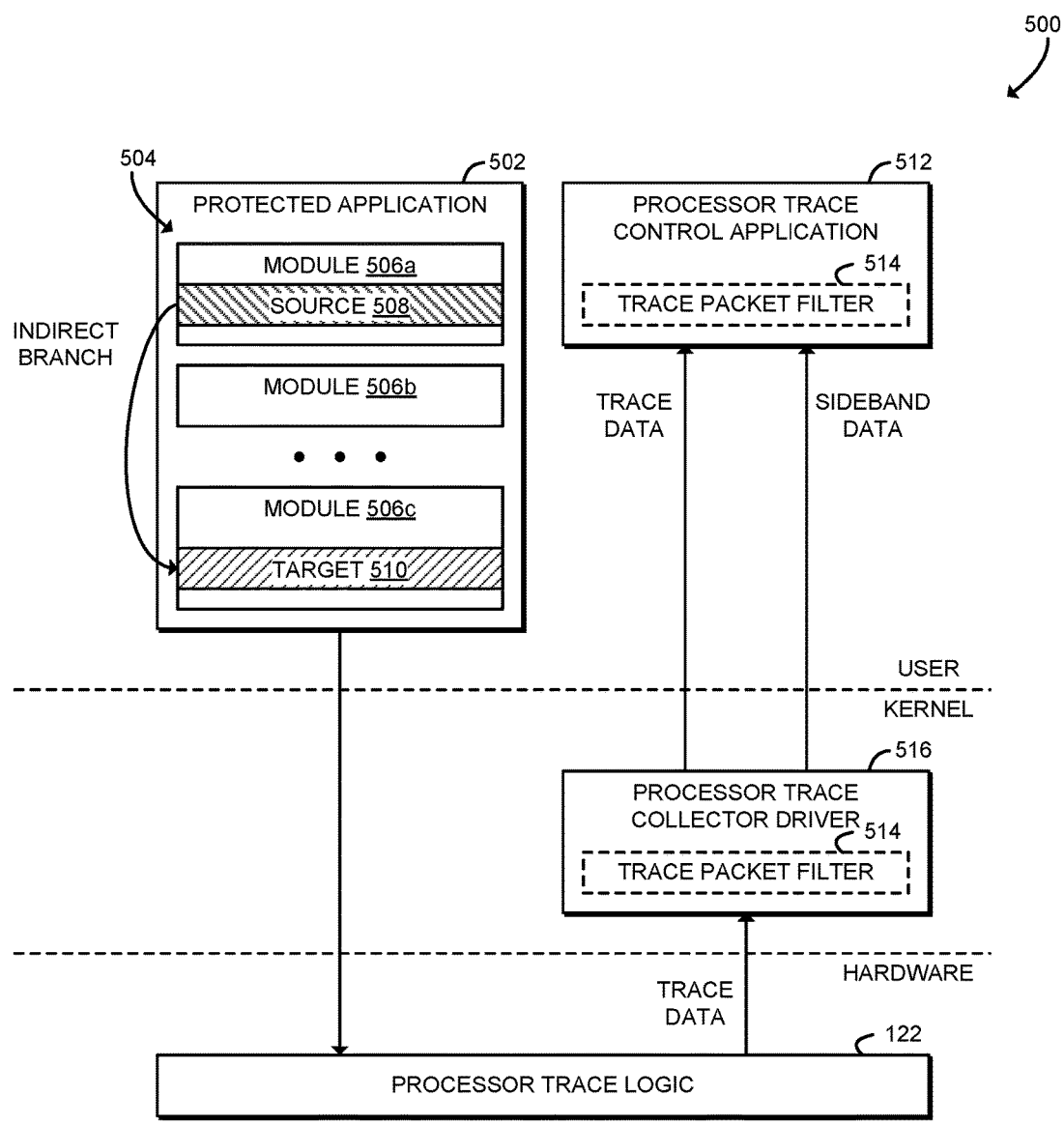
FIG. 5 is a schematic diagram illustrating an address space environment that may be established by the computing device of FIGS. 1 and 2.

Referring now to FIG. 5, a diagram 500 illustrates an address space environment that may be established by the computing device 100. As shown, the address space environment includes user space, including a protected application 502 and a processor trace control application 512; kernel space, including a processor trace collector driver 516; and hardware, including the processor trace logic 122.

As described above, the protected application 502 may be embodied as any user mode process, thread, lightweight process, or other program executed by the computing device 100. The protected application 502 includes an address space 504, which may be embodied as a linear address space or other virtual address space. The address space 504 includes multiple modules 506, which may be embodied as dynamically loaded code modules that are each loaded at a particular range in the address space 504, which may be randomized using ASLR. As shown, execution of the protected application 502 may generate indirect branches, such as the illustrative indirect branch from a source address 508 in the module 506a to a target address 510 in the module 506c.

The illustrative processor trace collector driver 516 programs the processor trace logic 122 to generate instruction trace data for the protected application 502 as described above in connection with block 304 of FIG. 3. The processor trace collector driver 516 receives the trace data generated by the processor trace logic 122 and forwards the trace data to the processor trace control application 512. The processor trace collector driver 516 may also provide sideband data to the processor trace control application 512, such as process memory map data for the protected application 502. For example, the processor trace collector driver 516 may determine the process memory map as described above in connection with block 302 of FIG. 3.

Similar to the protected application 502, the processor trace control application 512 may be embodied as any user mode process, thread, lightweight process, or other program executed by the computing device 100. The illustrative processor trace control application 512 analyzes the trace data to identify indirect branches executed by the protected application 502 and determine whether those indirect branches are between different modules 506. For example, as described above in connection with FIG. 3, the processor trace control application 512 may identify the target address 510 using a TIP packet or other trace data, and use process memory map data to determine that the target address 510 is included in the module 506c. As described above, the trace data may not include source address 508 information for certain indirect branches. Thus, the processor trace control application 512 may identify the source module 506a based on the TIP packet or other trace data for the previous indirect branch executed by the protected application 502. The processor trace control application 512 may also use the process memory map data to determine that the previous indirect branch target is included in the module 506a. Because the illustrative source 508 and the target 510 are included in different modules 506a, 506c, the processor trace control application 512 may apply the inter-module control transfer policy as described above in connection with FIGS. 3 and 4.

As shown, the processor trace control application 512 may also include a trace packet filter 514. As described above in connection with block 308 of FIG. 3, the illustrative trace packet filter 514 extracts TIP and FUP packets from the trace data in order to reduce the volume of trace data to be processed and otherwise improve performance. As shown, in some embodiments the trace packet filter 514 may be included in the processor trace collector driver 516 instead of the processor trace control application 512. In those embodiments, a reduced volume of trace data may be transferred from kernel space to user space.

It should be appreciated that, in some embodiments, the methods 300 and/or 400 may be embodied as various instructions stored on a computer-readable media, which may be executed by the processor 120 and/or other components of the computing device 100 to cause the computing device 100 to perform the respective method 300 and/or 400. The computer-readable media may be embodied as any type of media capable of being read by the computing device 100 including, but not limited to, the memory 126, the data storage device 128, firmware devices, other memory or data storage devices of the computing device 100, portable media readable by a peripheral device 132 of the computing device 100, and/or other media.

EXAMPLES

Illustrative examples of the technologies disclosed herein are provided below. An embodiment of the technologies may include any one or more, and any combination of, the examples described below.

Example 1 includes a computing device for control flow validation, the computing device comprising: a processor that includes processor trace logic to generate trace data indicative of control flow of a protected application of the computing device; a trace decoder to identify an indirect branch target based on the trace data; a transfer analyzer to determine whether the indirect branch target is included in a first module of the protected application, wherein a previous indirect branch target is included in the first module of the protected application; and a policy enforcer to (i) determine whether an inter-module transfer policy is satisfied in response to a determination that the indirect branch target is not included in the first module, (ii) store the indirect branch target as the previous indirect branch target in response to a determination that the inter-module transfer policy is satisfied, and (iii) generate an exception in response to a determination that the inter-module transfer policy is not satisfied.

Example 2 includes the subject matter of Example 1, and wherein the first module comprises a dynamically linked module of executable code.

Example 3 includes the subject matter of any of Examples 1 and 2, and wherein: the transfer analyzer is further to (i) identify an asynchronous flow update based on the trace data, and (ii) update a thread context in response to identification of the asynchronous flow update; and to determine whether the indirect branch target is included in the first module of the protected application comprises to determine whether the indirect branch target is included in the first module of the protected application in response to an updating of the thread context.

Example 4 includes the subject matter of any of Examples 1-3, and wherein to update the thread context comprises to update the previous indirect branch target based on the thread context.

Example 5 includes the subject matter of any of Examples 1-4, and wherein to determine whether the indirect branch target is included in the first module of the protected application comprises to access a memory address space map of the protected application.

Example 6 includes the subject matter of any of Examples 1-5, and wherein: the trace decoder is further to extract target instruction pointer (TIP) and flow update (FUP) packets from the trace data; wherein to identify the indirect branch target comprises to identify the indirect branch target in response to extraction of the TIP and FUP packets.

Example 7 includes the subject matter of any of Examples 1-6, and wherein to extract the TIP and the FUP packets from the trace data comprises to extract the TIP and the FUP packets from the trace data by a kernel mode process of the computing device.

Example 8 includes the subject matter of any of Examples 1-7, and wherein to extract the TIP and the FUP packets from the trace data comprises to extract the TIP and the FUP packets from the trace data by a user mode process of the computing device.

Example 9 includes the subject matter of any of Examples 1-8, and wherein the indirect branch target is included in a second module of the protected application, and wherein to determine whether the inter-module transfer policy is satisfied comprises to: determine whether the indirect branch target is an exported function of the second module; and determine that the inter-module transfer policy is satisfied in response to a determination that the indirect branch target is an exported function.

Example 10 includes the subject matter of any of Examples 1-9, and wherein to determine whether the inter-module transfer policy is satisfied further comprises to: determine whether indirect branch target is a memory permission function in response to the determination that the indirect branch target is an exported function; and determine that the inter-module transfer policy is not satisfied in response to a determination that the indirect branch target is a memory permission function.

Example 11 includes the subject matter of any of Examples 1-10, and wherein to determine whether the inter-module transfer policy is satisfied further comprises to: determine whether the first module and the second module originate from a same package in response to a determination that the indirect branch target is not an exported function; and determine that the inter-module transfer policy is satisfied in response to a determination that the first module and the second module originate from the same package.

Example 12 includes the subject matter of any of Examples 1-11, and wherein to determine whether the inter-module transfer policy is satisfied further comprises to: determine whether an express object inheritance chain exists from the first module to the second module in response to a determination that the first module and the second module do not originate from the same package; and determine that the inter-module transfer policy is satisfied in response to a determination that the express object inheritance chain exists.

Example 13 includes the subject matter of any of Examples 1-12, and wherein to determine whether the express object inheritance chain exists comprises to analyze a source header file associated with each of the first module and the second module.

Example 14 includes the subject matter of any of Examples 1-13, and wherein to determine whether the inter-module transfer policy is satisfied further comprises to: determine whether the indirect branch target is included in a predetermined list of valid targets in response to a determination that the express object inheritance chain does not exist; and determine that the inter-module transfer policy is satisfied in response to a determination that the indirect branch target is included in the predetermined list of valid targets.

Example 15 includes the subject matter of any of Examples 1-14, and wherein to determine whether the inter-module transfer policy is satisfied further comprises to determine that the inter-module transfer policy is not satisfied in response to a determination that the indirect branch target is not included in the predetermined list of valid targets.

Example 16 includes a method for control flow validation, the method comprising: generating, by a processor trace logic of a processor of a computing device, trace data indicative of control flow of a protected application of the computing device; identifying, by the computing device, an indirect branch target based on the trace data; determining, by the computing device, whether the indirect branch target is included in a first module of the protected application, wherein a previous indirect branch target is included in the first module of the protected application; determining, by the computing device, whether an inter-module transfer policy is satisfied in response to determining that the indirect branch target is not included in the first module; storing, by the computing device, the indirect branch target as the previous indirect branch target in response to determining that the inter-module transfer policy is satisfied; and generating, by the computing device, an exception in response to determining that the inter-module transfer policy is not satisfied.

Example 17 includes the subject matter of Example 16, and wherein the first module comprises a dynamically linked module of executable code.

Example 18 includes the subject matter of any of Examples 16 and 17, and further comprising: identifying, by the computing device, an asynchronous flow update based on the trace data; and updating, by the computing device, a thread context in response to identifying the asynchronous flow update; wherein determining whether the indirect branch target is included in the first module of the protected application comprises determining whether the indirect branch target is included in the first module of the protected application in response to updating the thread context.

Example 19 includes the subject matter of any of Examples 16-18, and wherein updating the thread context comprises updating the previous indirect branch target based on the thread context.

Example 20 includes the subject matter of any of Examples 16-19, and wherein determining whether the indirect branch target is included in the first module of the protected application comprises accessing a memory address map of the protected application.

Example 21 includes the subject matter of any of Examples 16-20, and further comprising: extracting, by the computing device, target instruction pointer (TIP) and flow update (FUP) packets from the trace data; wherein identifying the indirect branch target comprises identifying the indirect branch target in response to extracting the TIP and FUP packets.

Example 22 includes the subject matter of any of Examples 16-21, and wherein extracting the TIP and the FUP packets from the trace data comprises extracting the TIP and the FUP packets from the trace data by a kernel mode process of the computing device.

Example 23 includes the subject matter of any of Examples 16-22, and wherein extracting the TIP and the FUP packets from the trace data comprises extracting the TIP and the FUP packets from the trace data by a user mode process of the computing device.

Example 24 includes the subject matter of any of Examples 16-23, and wherein the indirect branch target is included in a second module of the protected application, and wherein determining whether the inter-module transfer policy is satisfied comprises: determining whether the indirect branch target is an exported function of the second module; and determining that the inter-module transfer policy is satisfied in response to determining that the indirect branch target is an exported function.

Example 25 includes the subject matter of any of Examples 16-24, and wherein determining whether the inter-module transfer policy is satisfied further comprises: determining whether indirect branch target is a memory permission function in response to determining that the indirect branch target is an exported function; and determining that the inter-module transfer policy is not satisfied in response to determining that the indirect branch target is a memory permission function.

Example 26 includes the subject matter of any of Examples 16-25, and wherein determining whether the inter-module transfer policy is satisfied further comprises: determining whether the first module and the second module originate from a same package in response to determining that the indirect branch target is not an exported function; and determining that the inter-module transfer policy is satisfied in response to determining that the first module and the second module originate from the same package.

Example 27 includes the subject matter of any of Examples 16-26, and wherein determining whether the inter-module transfer policy is satisfied further comprises: determining whether an express object inheritance chain exists from the first module to the second module in response to determining that the first module and the second module do not originate from the same package; and determining that the inter-module transfer policy is satisfied in response to determining that the express object inheritance chain exists.

Example 28 includes the subject matter of any of Examples 16-27, and wherein determining whether the express object inheritance chain exists comprises analyzing a source header file associated with each of the first module and the second module.

Example 29 includes the subject matter of any of Examples 16-28, and wherein determining whether the inter-module transfer policy is satisfied further comprises: determining whether the indirect branch target is included in a predetermined list of valid targets in response to determining that the express object inheritance chain does not exist; and determining that the inter-module transfer policy is satisfied in response to determining that the indirect branch target is included in the predetermined list of valid targets.

Example 30 includes the subject matter of any of Examples 16-29, and wherein determining whether the inter-module transfer policy is satisfied further comprises determining that the inter-module transfer policy is not satisfied in response to determining that the indirect branch target is not included in the predetermined list of valid targets.

Example 31 includes a computing device comprising: a processor; and a memory having stored therein a plurality of instructions that when executed by the processor cause the computing device to perform the method of any of Examples 16-30.

Example 32 includes one or more non-transitory, computer readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for control flow validation, the computing device comprising: means for generating, by a processor trace logic of a processor of the computing device, trace data indicative of control flow of a protected application of the computing device; means for identifying an indirect branch target based on the trace data; means for determining whether the indirect branch target is included in a first module of the protected application, wherein a previous indirect branch target is included in the first module of the protected application; means for determining whether an inter-module transfer policy is satisfied in response to determining that the indirect branch target is not included in the first module; means for storing the indirect branch target as the previous indirect branch target in response to determining that the inter-module transfer policy is satisfied; and means for generating an exception in response to determining that the inter-module transfer policy is not satisfied.

Example 35 includes the subject matter of Example 34, and wherein the first module comprises a dynamically linked module of executable code.

Example 36 includes the subject matter of any of Examples 34 and 35, and further comprising: means for identifying an asynchronous flow update based on the trace data; and means for updating a thread context in response to identifying the asynchronous flow update; wherein the means for determining whether the indirect branch target is included in the first module of the protected application comprises means for determining whether the indirect branch target is included in the first module of the protected application in response to updating the thread context.

Example 37 includes the subject matter of any of Examples 34-36, and wherein the means for updating the thread context comprises means for updating the previous indirect branch target based on the thread context.

Example 38 includes the subject matter of any of Examples 34-37, and wherein the means for determining whether the indirect branch target is included in the first module of the protected application comprises means for accessing a memory address space map of the protected application.

Example 39 includes the subject matter of any of Examples 34-38, and further comprising: means for extracting target instruction pointer (TIP) and flow update (FUP) packets from the trace data; wherein the means for identifying the indirect branch target comprises means for identifying the indirect branch target in response to extracting the TIP and FUP packets.

Example 40 includes the subject matter of any of Examples 34-39, and wherein the means for extracting the TIP and the FUP packets from the trace data comprises means for extracting the TIP and the FUP packets from the trace data by a kernel mode process of the computing device.

Example 41 includes the subject matter of any of Examples 34-40, and wherein the means for extracting the TIP and the FUP packets from the trace data comprises means for extracting the TIP and the FUP packets from the trace data by a user mode process of the computing device.

Example 42 includes the subject matter of any of Examples 34-41, and wherein the indirect branch target is included in a second module of the protected application, and wherein the means for determining whether the inter-module transfer policy is satisfied comprises: means for determining whether the indirect branch target is an exported function of the second module; and means for determining that the inter-module transfer policy is satisfied in response to determining that the indirect branch target is an exported function.

Example 43 includes the subject matter of any of Examples 34-42, and wherein the means for determining whether the inter-module transfer policy is satisfied further comprises: means for determining whether indirect branch target is a memory permission function in response to determining that the indirect branch target is an exported function; and means for determining that the inter-module transfer policy is not satisfied in response to determining that the indirect branch target is a memory permission function.

Example 44 includes the subject matter of any of Examples 34-43, and wherein the means for determining whether the inter-module transfer policy is satisfied further comprises: means for determining whether the first module and the second module originate from a same package in response to determining that the indirect branch target is not an exported function; and means for determining that the inter-module transfer policy is satisfied in response to determining that the first module and the second module originate from the same package.

Example 45 includes the subject matter of any of Examples 34-44, and wherein the means for determining whether the inter-module transfer policy is satisfied further comprises: means for determining whether an express object inheritance chain exists from the first module to the second module in response to determining that the first module and the second module do not originate from the same package; and means for determining that the inter-module transfer policy is satisfied in response to determining that the express object inheritance chain exists.

Example 46 includes the subject matter of any of Examples 34-45, and wherein the means for determining whether the express object inheritance chain exists comprises means for analyzing a source header file associated with each of the first module and the second module.

Example 47 includes the subject matter of any of Examples 34-46, and wherein the means for determining whether the inter-module transfer policy is satisfied further comprises: means for determining whether the indirect branch target is included in a predetermined list of valid targets in response to determining that the express object inheritance chain does not exist; and means for determining that the inter-module transfer policy is satisfied in response to determining that the indirect branch target is included in the predetermined list of valid targets.

Example 48 includes the subject matter of any of Examples 34-47, and wherein the means for determining whether the inter-module transfer policy is satisfied further comprises means for determining that the inter-module transfer policy is not satisfied in response to determining that the indirect branch target is not included in the predetermined list of valid targets.

The invention claimed is:

1. A computing device for control flow validation, the computing device comprising:
   a processor that includes processor trace logic to generate trace data indicative of control flow of a protected application of the computing device;
   a trace decoder to identify an indirect branch target based on the trace data;
   a transfer analyzer to determine whether the indirect branch target is included in a first module of the protected application, wherein a previous indirect branch target is included in the first module of the protected application; and
   a policy enforcer to (i) determine whether an inter-module transfer policy is satisfied in response to a determination that the indirect branch target is not included in the first module, (ii) store the indirect branch target as the previous indirect branch target in response to a determination that the inter-module transfer policy is satisfied, and (iii) generate an exception in response to a determination that the inter-module transfer policy is not satisfied.

2. The computing device of claim 1, wherein:
   the transfer analyzer is further to (i) identify an asynchronous flow update based on the trace data, and (ii) update a thread context in response to identification of the asynchronous flow update; and
   to determine whether the indirect branch target is included in the first module of the protected application comprises to determine whether the indirect branch target is included in the first module of the protected application in response to an updating of the thread context.

3. The computing device of claim 2, wherein to update the thread context comprises to update the previous indirect branch target based on the thread context.

4. The computing device of claim 1, wherein:
the trace decoder is further to extract target instruction pointer (TIP) and flow update (FUP) packets from the trace data;
wherein to identify the indirect branch target comprises to identify the indirect branch target in response to extraction of the TIP and FUP packets.

5. The computing device of claim 4, wherein to extract the TIP and the FUP packets from the trace data comprises to extract the TIP and the FUP packets from the trace data by a kernel mode process of the computing device.

6. The computing device of claim 1, wherein the indirect branch target is included in a second module of the protected application, and wherein to determine whether the inter-module transfer policy is satisfied comprises to:
determine whether the indirect branch target is an exported function of the second module; and
determine that the inter-module transfer policy is satisfied in response to a determination that the indirect branch target is an exported function.

7. The computing device of claim 6, wherein to determine whether the inter-module transfer policy is satisfied further comprises to:
determine whether indirect branch target is a memory permission function in response to the determination that the indirect branch target is an exported function; and
determine that the inter-module transfer policy is not satisfied in response to a determination that the indirect branch target is a memory permission function.

8. The computing device of claim 6, wherein to determine whether the inter-module transfer policy is satisfied further comprises to:
determine whether the first module and the second module originate from a same package in response to a determination that the indirect branch target is not an exported function; and
determine that the inter-module transfer policy is satisfied in response to a determination that the first module and the second module originate from the same package.

9. The computing device of claim 8, wherein to determine whether the inter-module transfer policy is satisfied further comprises to:
determine whether an express object inheritance chain exists from the first module to the second module in response to a determination that the first module and the second module do not originate from the same package; and
determine that the inter-module transfer policy is satisfied in response to a determination that the express object inheritance chain exists.

10. The computing device of claim 9, wherein to determine whether the express object inheritance chain exists comprises to analyze a source header file associated with each of the first module and the second module.

11. The computing device of claim 9, wherein to determine whether the inter-module transfer policy is satisfied further comprises to:
determine whether the indirect branch target is included in a predetermined list of valid targets in response to a determination that the express object inheritance chain does not exist; and
determine that the inter-module transfer policy is satisfied in response to a determination that the indirect branch target is included in the predetermined list of valid targets.

12. The computing device of claim 11, wherein to determine whether the inter-module transfer policy is satisfied further comprises to determine that the inter-module transfer policy is not satisfied in response to a determination that the indirect branch target is not included in the predetermined list of valid targets.

13. A method for control flow validation, the method comprising:
generating, by a processor trace logic of a processor of a computing device, trace data indicative of control flow of a protected application of the computing device;
identifying, by the computing device, an indirect branch target based on the trace data;
determining, by the computing device, whether the indirect branch target is included in a first module of the protected application, wherein a previous indirect branch target is included in the first module of the protected application;
determining, by the computing device, whether an inter-module transfer policy is satisfied in response to determining that the indirect branch target is not included in the first module;
storing, by the computing device, the indirect branch target as the previous indirect branch target in response to determining that the inter-module transfer policy is satisfied; and
generating, by the computing device, an exception in response to determining that the inter-module transfer policy is not satisfied.

14. The method of claim 13, further comprising:
identifying, by the computing device, an asynchronous flow update based on the trace data; and
updating, by the computing device, a thread context in response to identifying the asynchronous flow update;
wherein determining whether the indirect branch target is included in the first module of the protected application comprises determining whether the indirect branch target is included in the first module of the protected application in response to updating the thread context.

15. The method of claim 13, further comprising:
extracting, by the computing device, target instruction pointer (TIP) and flow update (FUP) packets from the trace data;
wherein identifying the indirect branch target comprises identifying the indirect branch target in response to extracting the TIP and FUP packets.

16. The method of claim 13, wherein the indirect branch target is included in a second module of the protected application, and wherein determining whether the inter-module transfer policy is satisfied comprises:
determining whether the indirect branch target is an exported function of the second module;
determining whether indirect branch target is a memory permission function in response to determining that the indirect branch target is an exported function;
determining that the inter-module transfer policy is satisfied in response to determining that the indirect branch target is an exported function and determining that the indirect branch target is not a memory permission function; and
determining that the inter-module transfer policy is not satisfied in response to determining that the indirect branch target is a memory permission function.

17. The method of claim 16, wherein determining whether the inter-module transfer policy is satisfied further comprises:

determining whether the first module and the second module originate from a same package in response to determining that the indirect branch target is not an exported function;
determining that the inter-module transfer policy is satisfied in response to determining that the first module and the second module originate from the same package;
determining whether an express object inheritance chain exists from the first module to the second module in response to determining that the first module and the second module do not originate from the same package; and
determining that the inter-module transfer policy is satisfied in response to determining that the express object inheritance chain exists.

18. The method of claim 17, wherein determining whether the inter-module transfer policy is satisfied further comprises:
determining whether the indirect branch target is included in a predetermined list of valid targets in response to determining that the express object inheritance chain does not exist;
determining that the inter-module transfer policy is satisfied in response to determining that the indirect branch target is included in the predetermined list of valid targets; and
determining that the inter-module transfer policy is not satisfied in response to determining that the indirect branch target is not included in the predetermined list of valid targets.

19. One or more non-transitory, computer-readable storage media comprising a plurality of instructions stored thereon that, in response to being executed, cause a computing device to:
generate, by a processor trace logic of a processor of the computing device, trace data indicative of control flow of a protected application of the computing device;
identify an indirect branch target based on the trace data;
determine whether the indirect branch target is included in a first module of the protected application, wherein a previous indirect branch target is included in the first module of the protected application;
determine whether an inter-module transfer policy is satisfied in response to determining that the indirect branch target is not included in the first module;
store the indirect branch target as the previous indirect branch target in response to determining that the inter-module transfer policy is satisfied; and
generate an exception in response to determining that the inter-module transfer policy is not satisfied.

20. The one or more non-transitory, computer-readable storage media of claim 19, further comprising a plurality of instructions stored thereon that, in response to being executed, cause the computing device to:
identify an asynchronous flow update based on the trace data; and
update a thread context in response to identifying the asynchronous flow update;
wherein to determine whether the indirect branch target is included in the first module of the protected application comprises to determine whether the indirect branch target is included in the first module of the protected application in response to updating the thread context.

21. The one or more non-transitory, computer-readable storage media of claim 19, further comprising a plurality of instructions stored thereon that, in response to being executed, cause the computing device to:
extract target instruction pointer (TIP) and flow update (FUP) packets from the trace data;
wherein to identify the indirect branch target comprises to identify the indirect branch target in response to extracting the TIP and FUP packets.

22. The one or more non-transitory, computer-readable storage media of claim 19, wherein the indirect branch target is included in a second module of the protected application, and wherein to determine whether the inter-module transfer policy is satisfied comprises to:
determine whether the indirect branch target is an exported function of the second module;
determine whether indirect branch target is a memory permission function in response to determining that the indirect branch target is an exported function;
determine that the inter-module transfer policy is satisfied in response to determining that the indirect branch target is an exported function and determining that the indirect branch target is not a memory permission function; and
determine that the inter-module transfer policy is not satisfied in response to determining that the indirect branch target is a memory permission function.

23. The one or more non-transitory, computer-readable storage media of claim 22, wherein to determine whether the inter-module transfer policy is satisfied further comprises to:
determine whether the first module and the second module originate from a same package in response to determining that the indirect branch target is not an exported function;
determine that the inter-module transfer policy is satisfied in response to determining that the first module and the second module originate from the same package;
determine whether an express object inheritance chain exists from the first module to the second module in response to determining that the first module and the second module do not originate from the same package; and
determine that the inter-module transfer policy is satisfied in response to determining that the express object inheritance chain exists.

24. The one or more non-transitory, computer-readable storage media of claim 23, wherein to determine whether the inter-module transfer policy is satisfied further comprises to:
determine whether the indirect branch target is included in a predetermined list of valid targets in response to determining that the express object inheritance chain does not exist;
determine that the inter-module transfer policy is satisfied in response to determining that the indirect branch target is included in the predetermined list of valid targets; and
determine that the inter-module transfer policy is not satisfied in response to determining that the indirect branch target is not included in the predetermined list of valid targets.

* * * * *